US006958702B1

(12) United States Patent
Yamasaki et al.

(10) Patent No.: US 6,958,702 B1
(45) Date of Patent: Oct. 25, 2005

(54) COMMUNICATION APPARATUS CAPABLE OF REGISTERING ID CODES APPROPRIATED TO PORTABLE TRANSMITTERS BY OPERATING THE TRANSMITTERS

(75) Inventors: Shigenori Yamasaki, Miyagi-ken (JP); Koichi Abe, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 920 days.

(21) Appl. No.: 09/654,469

(22) Filed: Sep. 1, 2000

(30) Foreign Application Priority Data

Sep. 9, 1999 (JP) .................................. 11-255918

(51) Int. Cl.[7] .......................................... G08C 19/00
(52) U.S. Cl. ............................. 340/825.72; 340/825.69
(58) Field of Search ...................... 340/825.22, 825.69, 340/825.72; 455/151.1, 151.2; 341/176; 359/148; 370/29; 345/91; 235/91

(56) References Cited

U.S. PATENT DOCUMENTS

| 4,928,778 A | * | 5/1990 | Tin | 180/167 |
| 5,267,299 A | * | 11/1993 | Nomura | 379/88.02 |
| 5,687,218 A | * | 11/1997 | Nakayama | 455/415 |
| 6,026,165 A | * | 2/2000 | Marino et al. | 380/273 |
| 6,028,505 A | * | 2/2000 | Drori | 340/426.17 |

* cited by examiner

Primary Examiner—Michael Horabik
Assistant Examiner—Matsuichiro Shimizu
(74) Attorney, Agent, or Firm—Brinks Hofer Gilson & Lione (57) ABSTRACT

A communication apparatus comprises a portable transmitter, having operating switches, first and second storing units, a first control unit, ID registration mode setting unit, and a transmitting unit; and a receiver, having a receiving unit, a third storing unit wherein reference code is stored, and a control signal generating unit. The portable transmitter transmits signals containing the ID code, and the receiver supplies control signals to controlled mechanisms at the time that the ID code within the received signals matches the reference code. The ID code is made up of a plurality of ID code sections. When the first control unit is set to the ID registration mode and at least one operating switch is operated the ID code section is eventually registered to the first storing unit as the ID code.

33 Claims, 10 Drawing Sheets

COMMUNICATION APPARATUS CAPABLE OF REGISTERING ID CODES APPROPRIATED TO PORTABLE TRANSMITTERS BY OPERATING THE TRANSMITTERS

BACKGROUND OF THE INVENTION

1. Field of the Invention

The present invention relates to a communication apparatus, and particularly relates to a communication apparatus wherein information signals containing ID (Identification) code are transmitted from a portable transmitter, and a controlled device is controlled in the event that the ID code within the information signals received with a receiver match a registered reference code, wherein the ID code of the portable transmitter is registered by the user.

2. Description of the Related Art

Keyless entry devices for automobiles are known as an example of communication apparatuses comprising a portable transmitter and a receiver, wherein upon transmitting of information signals containing ID code by operating the operating unit of the portable transmitter, the ID code is extracted from the information signals received at the receiver side, and wherein the controlled device can be controlled in the event that that ID code matches the reference code already registered thereto.

With such keyless entry devices, each user carries the portable transmitter, and the receiver is installed in the vehicle.

Figure 9:
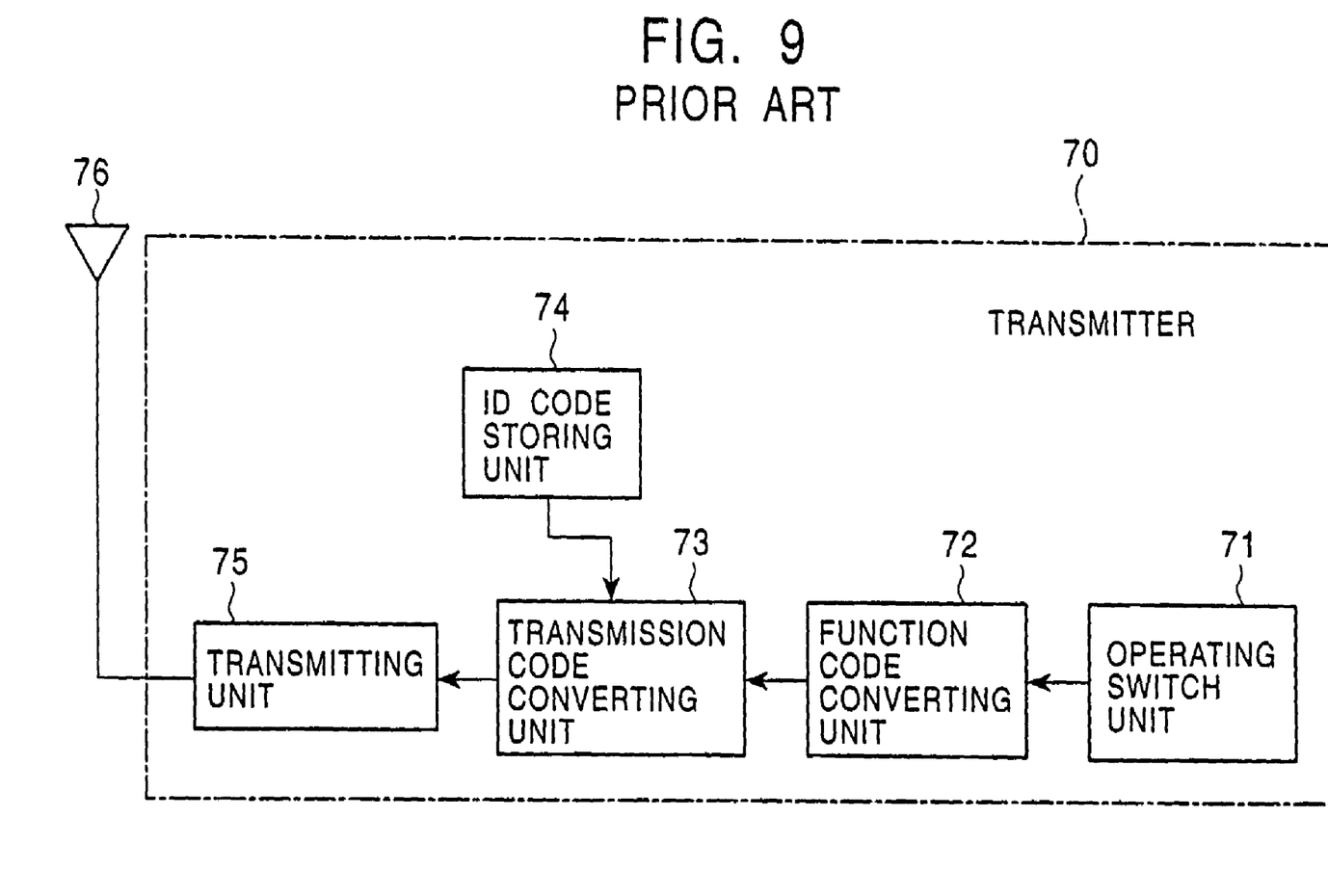
FIG. 9 is a block diagram illustrating an example of the configuration of a portable transmitter used with a known keyless entry apparatus.
Figure 10:
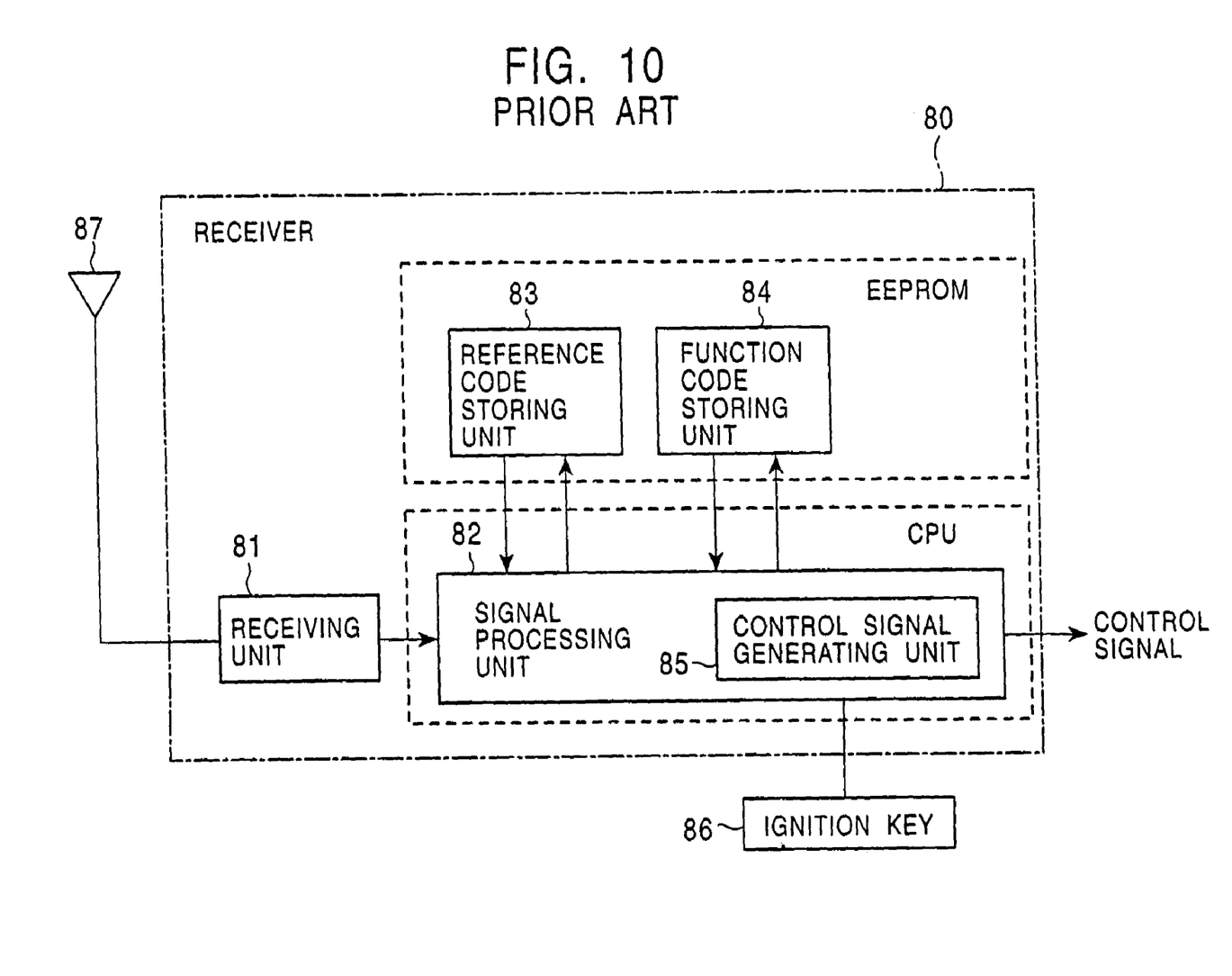
FIG. 10 is a block diagram illustrating an example of the configuration of a receiver used with a known keyless entry apparatus.

FIG. 9 is a block diagram illustrating an example of the configuration of a portable transmitter used with a known keyless entry device, and FIG. 10 is a block diagram illustrating an example of the configuration of a receiver used with a known keyless entry device.

As shown in FIG. 9, the portable transmitter 70 is provided with an operating switch unit 71 having one or more operating switches, a function code converting unit 72, a transmitting code converting unit 73, an ID code storing unit 74, a transmitting unit 75, and a transmitting antenna 76. These components 71 through 76 are connected as shown in FIG. 9.

Also, the receiver 80 is provided with a receiving unit 81, a signal processing unit 82, a reference code storing unit 83, a function code storing unit 84, a control signal generating unit 85 which is built into the signal processing unit 82, an automobile ignition key 86, and a receiving antenna 87, wherein the signal processing unit 82 and the control signal generating unit 85 are built into the control unit (CPU), and the reference code storing unit 83 and function code storing unit 84 are built into the EEPROM. These components 81 through 87 are connected as shown in FIG. 10.

The portable transmitter 70 and the receiver 80 with the above configurations each operate as described next.

First, with regard to the portable transmitter 70, the operating switch unit 71 generates various types of switch information for performing operations of controlled mechanisms of the vehicle, for example, locking or unlocking the doors, opening the trunk, and so forth, by the user operating desired operating switches. The function code converting unit 72 converts the switch information output from the operating switch unit 71 into function code corresponding to the information contents thereof. The ID code storing unit 74 stores ID code unique to each portable transmitter 70. The transmitting code converting unit 73 forms a transmitting code wherein a header code and an end code and the like are added to the function code output from the function code converting unit 72 and the ID code read out from the ID code storing unit 74. The transmitting unit 75 converts the transmitting code formed by the transmitting code converting unit 73 into transmitting signals carried by electromagnetic waves or the like, and transmits the transmitting signals through the transmitting antenna 76.

On the other hand, with regard to the receiver 80, the receiving unit 81 receives the transmitting signals through the receiving antenna 87, and restores the transmitting code. The signal processing unit 82 compares the ID code within the transmitting code with the reference code stored in the reference code storing unit 83, and in the event that a match between the ID code and the reference code is confirmed, the collation is performed between the function code within the transmitting code and the function code stored in the function code storing unit 84. The control signal generating unit 85 generate control signals corresponding to the function code matched by collation. The control signal is supplied to the corresponding controlled mechanism of the vehicle, such as the door for example, and the door is locked or unlocked.

In this case, the ID code appropriated to each portable transmitter 70 in the known keyless entry device is stored in the ID code storing unit 74 of the portable transmitter 70 at the time of manufacturing and is unique to the portable transmitter 70, and the reference code stored in the reference code storing unit 83 of the receiver 80 is stored as the reference code by extracting the ID code transmitted from the portable transmitter 70 and writing the extracted ID code to the reference code storing unit 83.

Generally, users using a keyless entry device prefer that there is no compatibility between the portable transmitter 70 of the user and the portable transmitter 70 of others, so the ID code of the portable transmitter 70 of the user must differ from the ID code of the portable transmitter 70 of others.

One problem is that the portable transmitter 70 of the known keyless entry device requires an ID code writing device, since ID codes which differ for each vehicle are written to the ID code storing units 74 by the manufacturer at the time of manufacturing. An additional problem is that ID code management becomes complicated.

SUMMARY OF THE INVENTION

The present invention has been made in view of the known portable transmitter and receiver combination, and it is an object thereof to provide a communication apparatus enabling ID codes appropriated to portable transmitters to be registered by operating the portable transmitter.

In order to achieve the above objects, a first aspect of the present invention is a communication apparatus including: a portable transmitter, having at least one operating switch, a first storing unit wherein an ID code is registered, a first control unit, and a transmitting unit. The ID code is made up of a plurality of ID code sections, each ID code section corresponding to an operation/of the operating switch. The portable transmitter also comprises an ID registration mode setting mechanism. When the first control unit is set to the ID registration mode by the ID registration mode setting mechanism and the operating switch is operated, the ID code sections are supplied to the first storing unit to register as the ID code.

In other embodiments, the operating switch may be operated multiple times and/or the ID code sections may be supplied sequentially to the first storing unit.

Also, in order to achieve the above objects, a second aspect of the present invention is a communication apparatus including: a portable transmitter, having at least one operating switch, a first storing unit wherein an ID code is registered, a second storing unit, a first control unit, and a transmitting unit. The ID code is made up of a plurality of ID code sections, each ID code section corresponding to an operation of the operating switch. The portable transmitter also comprises an ID registration mode setting mechanism. When the first control unit is set to the ID registration mode by the ID registration mode setting mechanism and the operating switch is operated, the ID code section is stored in the second storing unit, and at the point that all ID code sections are stored in the second storing unit, the all ID code sec ions are joined and transferred to the first storing unit, to register as the ID code.

Further, in order to achieve the above objects, a third aspect of the present invention is a communication apparatus including: a portable transmitter, having at least one operating switch, a first storing unit wherein an ID code is registered, a second storing unit, a first control unit, and a transmitting unit. The ID code is made up of a plurality of ID code sections, each ID code section corresponding to an operation of the operating switch. The portable transmitter comprises an ID registration mode setting mechanism. When the first control unit is set to the ID registration mode by the ID registration mode setting mechanism and the operating switch is operated, all ID code sections are stored in the second storing unit except for the last ID code section, and at the point that the last ID code section is formed, the ID code sections stored in the second storing unit are read out, the read ID code sections nd the last ID code section are joined and transferred to the first storing unit, to register as the ID code.

According to the first aspect, ID code registration can be made from the portable transmitter by operation of the user, and in this case, the ID code to be registered is a random code due to the switch operation timing, so a portable transmitter having no compatibility between the portable transmitter of the user and the portable transmitters of others can be obtained.

Also, according to the second aspect, the formed ID code sections are sequentially stored in a second storing unit formed of RAM, and at the point that all ID code sections are stored in the second storing unit, all ID code sections are joined and read out from the second storing unit, and transferred and registered as ID code to the first storing unit, so in the event that ID code registration has been aborted, all that is necessary is to erase the ID code sections stored in the RAM, so there is no effect on the first storing unit.

Also, according to the third aspect, the formed ID code sections are sequentially stored in a second storing unit formed of RAM, and at the point that the last ID code section is formed, the ID code sections stored in the second storing unit are read out from the second storing unit and joined with the last ID code section, and transferred and registered as ID code to the first storing unit, so the process of storing and reading the last ID code section to and from the second storing unit can be omitted, which is efficient.

DESCRIPTION OF THE PREFERRED EMBODIMENTS

The following is a description of the embodiments of the present invention, with reference to the drawings.

First Embodiment

Figure 1:
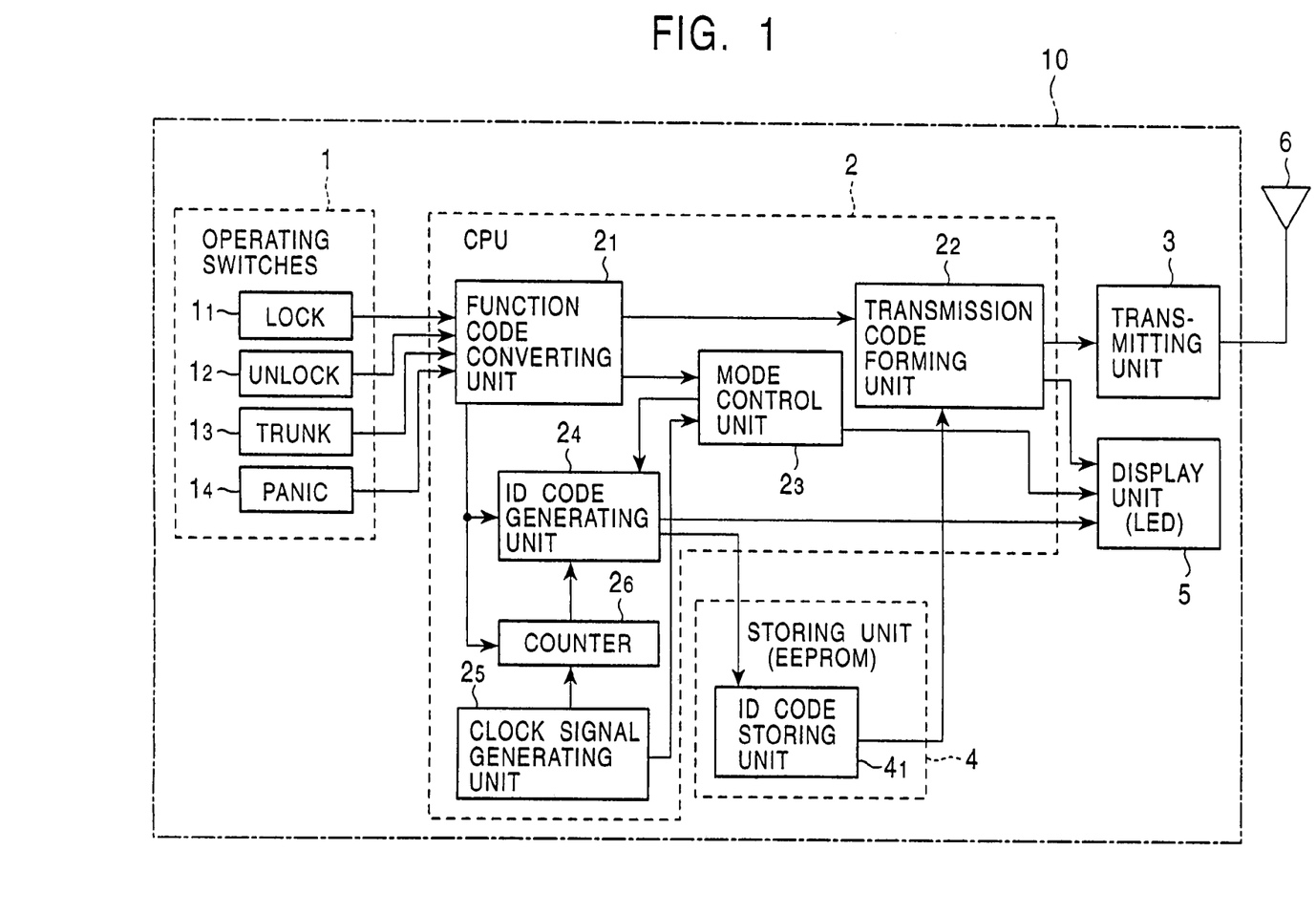
FIG. 1 is a block configuration diagram illustrating a first embodiment of the communication apparatus according to the present invention, and illustrates the configuration of the portable transmitter.
Figure 2:
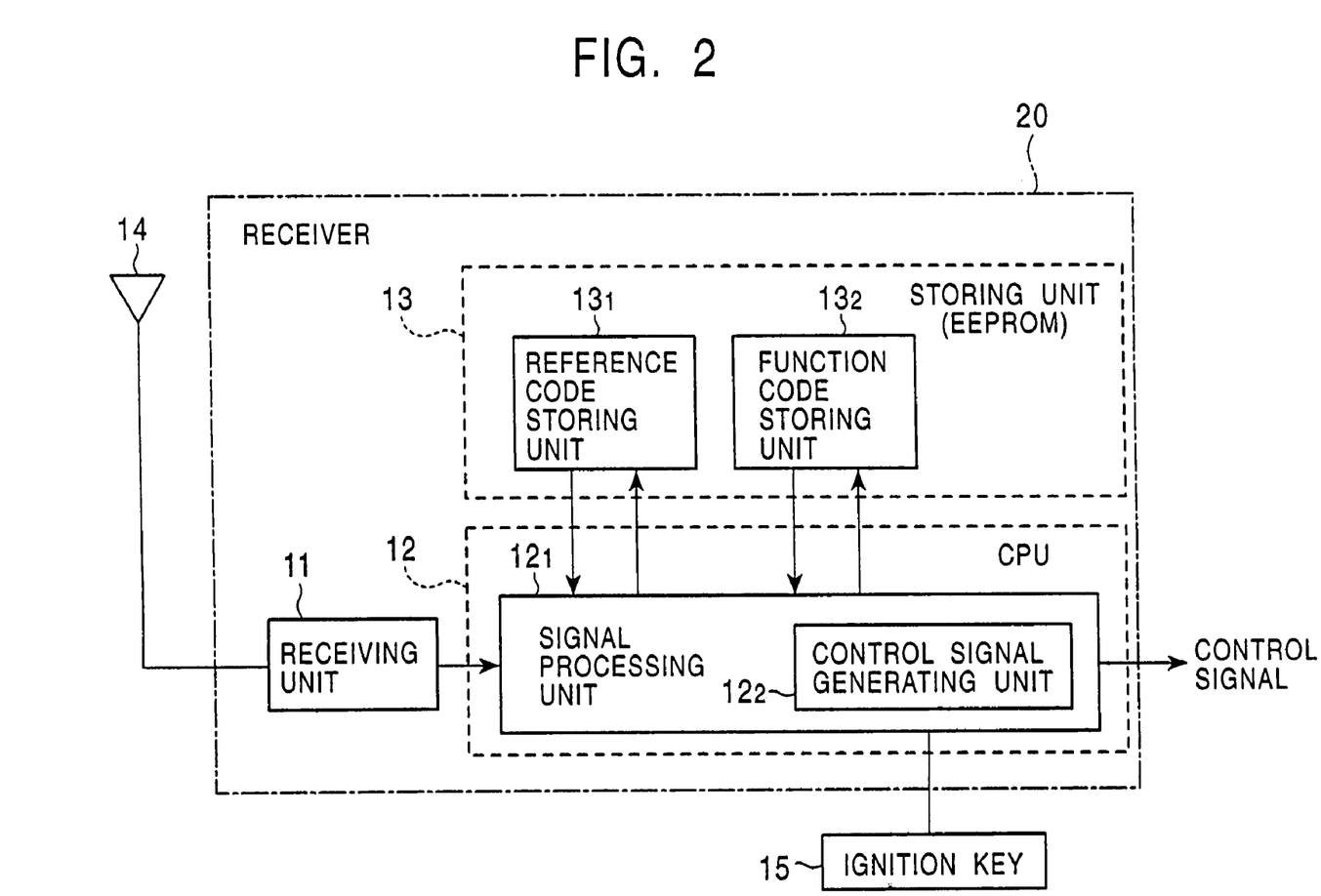
FIG. 2 is a block configuration diagram illustrating an embodiment of the communication apparatus according to the present invention, and illustrates the configuration of the receiver.

FIGS. 1 and 2 are block diagrams illustrating a first embodiment of the communication apparatus according to the present invention, wherein FIG. 1 is a block diagram illustrating the configuration of the portable transmitter 10, and FIG. 2 is a block diagram illustrating the configuration of the receiver 20, illustrating an example of a keyless entry device wherein the communication apparatus is made up of a portable transmitter 10 and a receiver 20.

As shown in FIG. 1, the portable transmitter 10 is provided with an operating switch unit (operating SW) 1 having one or more operating switches, a control unit (first control unit) (CPU) 2, a transmitting unit 3, an EEPROM (first storing unit) 4, a display unit 5, and a transmitting antenna 6. In this case, the operating switch unit 1 comprises a door lock switch $1_1$, door unlock switch $1_2$, trunk open switch $1_3$, panic switch $1_4$, and so forth. The control unit 2 comprises a function code converting unit $2_1$, a transmitting code forming unit $2_2$, a mode control unit $2_3$, an ID code generating unit $2_4$, a clock signal generating unit $2_5$, and a counter $2_6$. The EEPROM 4 has a built-in ID code storing unit $4_1$. The display unit 5 is provided with at least one light-emitting diode (LED).

The operating switch unit 1, control unit 2, transmitting unit 3, EEPROM 4, ID code storing unit $4_1$, display unit 5, and transmitting antenna 6, are connected as shown in FIG. 1. Also, the door lock switch $1_1$, door unlock switch $1_2$, trunk open switch $1_3$, and panic switch $1_4$ of the operating switch unit 1 are connected as shown in FIG. 1, and the function code converting unit $2_1$, transmitting code forming unit $2_2$, mode control unit $2_3$, ID code generating unit $2_4$, clock signal generating unit $2_5$, and counter $2_6$ of the control unit 2 are also connected as shown in FIG. 1.

On the other hand, as shown in FIG. 2, the receiver 20 comprises a receiver 11, control unit (second control unit) (CPU) 12, EEPROM (second storing unit) 13, and receiving antenna 14. In this case, the control unit 12 has a built-in signal processing unit $12_1$. The signal processing unit $12_1$ has a built-in control signal generating unit $12_2$, to which signals from an external ignition key 15 are input. The EEPROM 13 has built-in reference code storing unit 13, and function code storing unit $13_2$.

Then, the receiving unit 11, control unit 12, EEPROM 13, receiving antenna 14, and ignition key 15, are connected as shown in FIG. 2. Also, the signal processing unit $12_1$ and control signal generating unit $12_2$ of the control unit 12 are connected as shown in FIG. 2, and the reference code storing unit $13_1$ and function code storing unit $13_2$ of the EEPROM 13 are also connected as shown in FIG. 2.

Now, at the point that the user has obtained the portable transmitter 10 and receiver 20 of the above configuration (point of product purchase), no ID code has yet been registered to the ID code storing unit $4_1$ of the portable transmitter 10, nor has a reference code been registered to the reference code storing unit $13_1$ of the receiver 20. Accordingly, there is the need for the user to register an ID code to the ID code storing unit $4_1$ of the portable transmitter 10, and use the portable transmitter 10 to which the ID code has been registered to store the reference code in the reference code storing unit $13_1$ of the receiver 20, before using the portable transmitter 10 and receiver 20.

Figure 3:
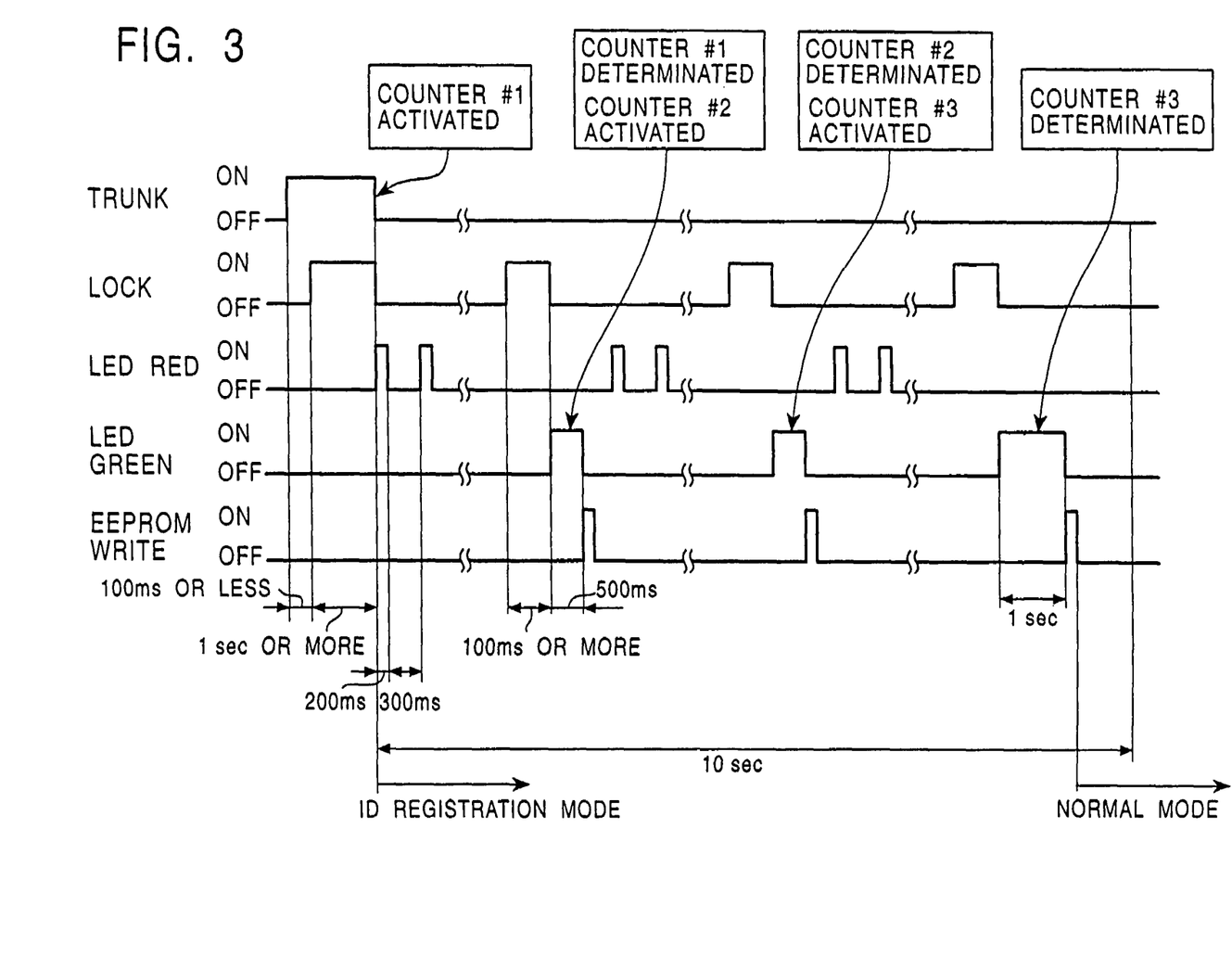
FIG. 3 is an explanatory diagram illustrating an example of the operating procedures for registering an ID code to the ID code storing unit of the portable transmitter shown in FIG. 1.

FIG. 3 is an explanatory diagram illustrating an example of the operating procedures at the time of registering the ID code to the ID code storing unit $4_1$ with the portable transmitter 10 shown in FIG. 1.

The operating procedures for registering the ID code to the ID code storing unit 41 of the portable transmitter 10 will now be described using the explanatory diagram shown in FIG. 3.

The user performs a predetermined operation using one or more operating switches of the operating switch unit 1 of the portable transmitter 10, e.g., first operating the trunk opening switch $1_3$, and within 100 milliseconds of this operation presses both the trunk opening switch $1_3$ and the door lock switch $1_1$ for 1 second or more, whereby the mode control unit $2_3$ detects that this predetermined operation has been made, and sets the control unit 2 in the ID registration mode. Once the control unit 2 is set in the ID registration mode, the counter $2_6$ is reset, the first count of clock signals supplied from the clock signal generating unit $2_5$ is started at the counter $2_6$, and a first pulse signal is supplied to one LED of the display unit 5, e.g., the red LED, from the mode control unit $2_3$. The red LED is lit multiple times for 200 milliseconds at 500 millisecond intervals due to the first pulse signals being supplied, thereby notifying the user that the portable transmitter 10 has been set in the ID registration mode. Incidentally, the intermittent lighting of the red LED continues as long as the portable transmitter 10 is set in the ID registration mode.

Next, the user operates the latter-operated switch of the operating switch unit 1 of the portable transmitter 10, the door lock switch $1_1$, for example, for 100 milliseconds or longer and then stops the operation, which causes a second pulse signal to be supplied to another LED of the display unit 5 from the ID code generating unit $2_4$, e.g., the green LED, and the green LED is lit for 500 milliseconds only one time. Then, at the point that the lighting of the green LED is finished, the first count value of the clock signal is determined at the counter $2_6$, the determined count value is supplied to the ID code storing unit $4_1$ of the EEPROM 4 through the ID code generating unit $2_4$, and is stored as the first ID code section. At this time, the counter $2_6$ is reset, subsequently starts the second count of clock signals being supplied, and the first pulse signals are supplied multiple times from the ID code generating unit $2_4$ to the red LED as in the case above, so that the red LED is lit intermittently.

Next, the user operates the door lock switch $1_1$ again for 100 milliseconds or more, and then stops the operation, which causes the second pulse signal to be supplied from the ID code generating unit $2_4$ to the green LED again, and the green LED is lit for 500 milliseconds only one time. Then, at the point that the lighting of the green LED is finished this time, the second count value of the clock signal is determined at the counter $2_6$, the determined count value is supplied to the ID code storing unit 41 through the ID code generating unit $2_4$, and is stored as the second ID code section. At this time also, the counter $2_6$ is reset, subsequently starts the third count of clock signals being supplied, and the red LED is lit intermittently.

Next, the user operates the door lock switch $1_1$ for the third time for 100 milliseconds or more, and then stops the operation, which causes the second pulse signal to be supplied from the ID code generating unit $2_4$ to the green LED, and the green LED is lit for 1 second only one time, which is a longer time than the previous two times. Then, at the point that the lighting of the green LED is finished this time, the third count value of the clock signal is determined at the counter $2_6$, the determined count value is supplied to the ID code storing unit $4_1$ through the ID code generating unit $2_4$, and is stored as the third ID code section.

The first through third ID code sections stored in the ID code storing unit 41 form one ID code as a whole.

In this case, the first through third ID code sections sequentially stored in the ID code storing unit $4_1$ (three count values) are each made up of 8 bits, and one of the 256 combinations for data values from 00000000 through 11111111 is stored in the ID code storing unit $4_1$ for each ID code section.

Following resetting of the counter $2_6$, the first count of the clock signal performed by the counter 26 sequentially changes from 00000000 to 11111111 each time a clock signal is applied, returns to 00000000 when 11111111 is reached, and then changes again toward 11111111. Then, when the first lighting of the green LED ends, the count value of the counter $2_6$ is stored in the ID code storing unit $4_1$ as the first code section.

Subsequently, the counter $2_6$ is reset, and the second and third counts of the clock signal performed by the counter $2_6$ act in the same manner as with the previous case, and when the second lighting of the green LED ends, the count value of the counter $2_6$ is stored in the ID code storing unit $4_1$ as the second code section, and when the third lighting of the green LED ends, the count value of the counter $2_6$ is stored in the ID code storing unit $4_1$ as the third code section.

In this way, the first through third code sections (count values) stored in the ID code storing unit $4_1$ of the portable transmitter 10 according to the first present embodiment are set randomly by switch operation timing by the user. Accordingly, with regard to the ID code formed by the entirety of the first through third code sections, the probability that the ID code registered to one portable transmitter 10 and the ID code registered td another portable transmitter 10 using the same registering means match is extremely small, and thus a portable transmitter 10 with no compatibility can be obtained.

In this case, with the portable transmitter 10, in the event that the control unit 2 enters the ID registration mode and 10 seconds elapse, the control unit 2 automatically reverts from the ID registration mode to the normal mode, and the blinking of the red LED on the display unit 5 ends.

Then, as shown in FIG. 3, at the point that the third count value is determined and the third lighting of the green LED ends, and registration of the ID code is performed to the ID code storing unit $4_1$, the control unit 2 reverts from the ID registration mode to the normal mode even in the event that 10 seconds have not elapsed since being set to the ID registration mode.

Figure 4:
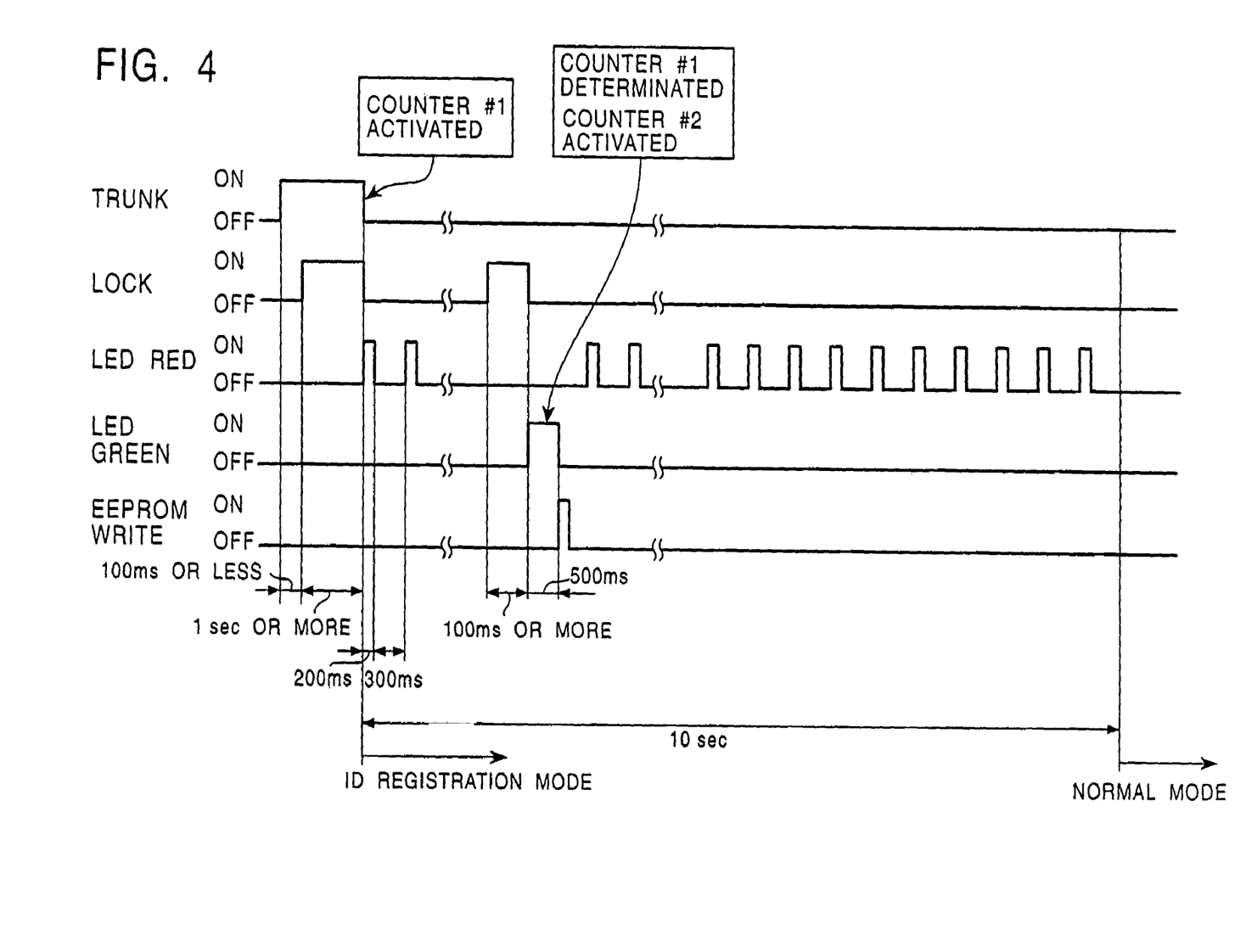
FIG. 4 is an explanatory action diagram illustrating an example wherein an ID code cannot be registered, at the time of registering an ID code to the ID code storing unit of the portable transmitter.

Next, FIG. 4 is an action describing diagram illustrating an example of a case wherein the ID code cannot be registered at the time of registering the ID code to the ID code storing unit $4_1$ of the portable transmitter 10.

The action in the event that the ID code cannot be registered will be described with reference to FIG. 4.

As shown in FIG. 4, the operating procedures up to the control unit 2 of the portable transmitter 10 being set to the ID registration mode by execution of predetermined operations of the operating switch unit 1 by the user, are the same as the operating procedures already described with reference to FIG. 3.

Next, the user operates the latter-operated switch of the operating switch unit 1 of the portable transmitter 10, the door lock switch $1_1$, for example, for 100 milliseconds or longer, and then stops the operation of the door lock switch $1_1$, which causes a second pulse signal to be supplied to the green LED of the display unit 5 from the ID code generating unit $2_4$, and the green LED is lit for 500 milliseconds. Then, at the point that the lighting of the green LED is finished, the first count value of the clock signal is determined at the counter $2_6$, the determined count value is supplied to the ID code storing unit $4_1$ through the ID code generating unit $2_4$, and is stored as the first ID code section in the ID code storing unit $4_1$. At this time, the counter $2_6$ is reset, subsequently starts the second count of clock signals being supplied, and the first pulse signals are supplied multiple times from the ID code generating unit $2_4$ to the red LED as in the case above, so that the red LED is lit intermittently.

Subsequently, in the event that the user does not operate the latter-operated switch of the operating switch unit 1 of the portable transmitter 10, the door lock switch $1_1$ for example, and 10 seconds elapse since the control unit 2 has been set to the ID registration mode, the control unit 2 automatically reverts from the ID registration mode to the normal mode. At this time, only the first count value of the clock signal is determined, and the second and third count values are not determined, so the ID code generating unit $2_4$ discards the first ID code section (first count value) stored in the ID code storing unit $4_1$, and there is no registration of ID code made to the ID code storing unit $4_1$.

Another state that the ID code is not registered to the ID code storing unit $4_1$ is a case wherein the first and second count values are each determined, and subsequently, the control unit 2 automatically reverts from the ID registration mode to the normal mode.

Second Embodiment

Figure 5:
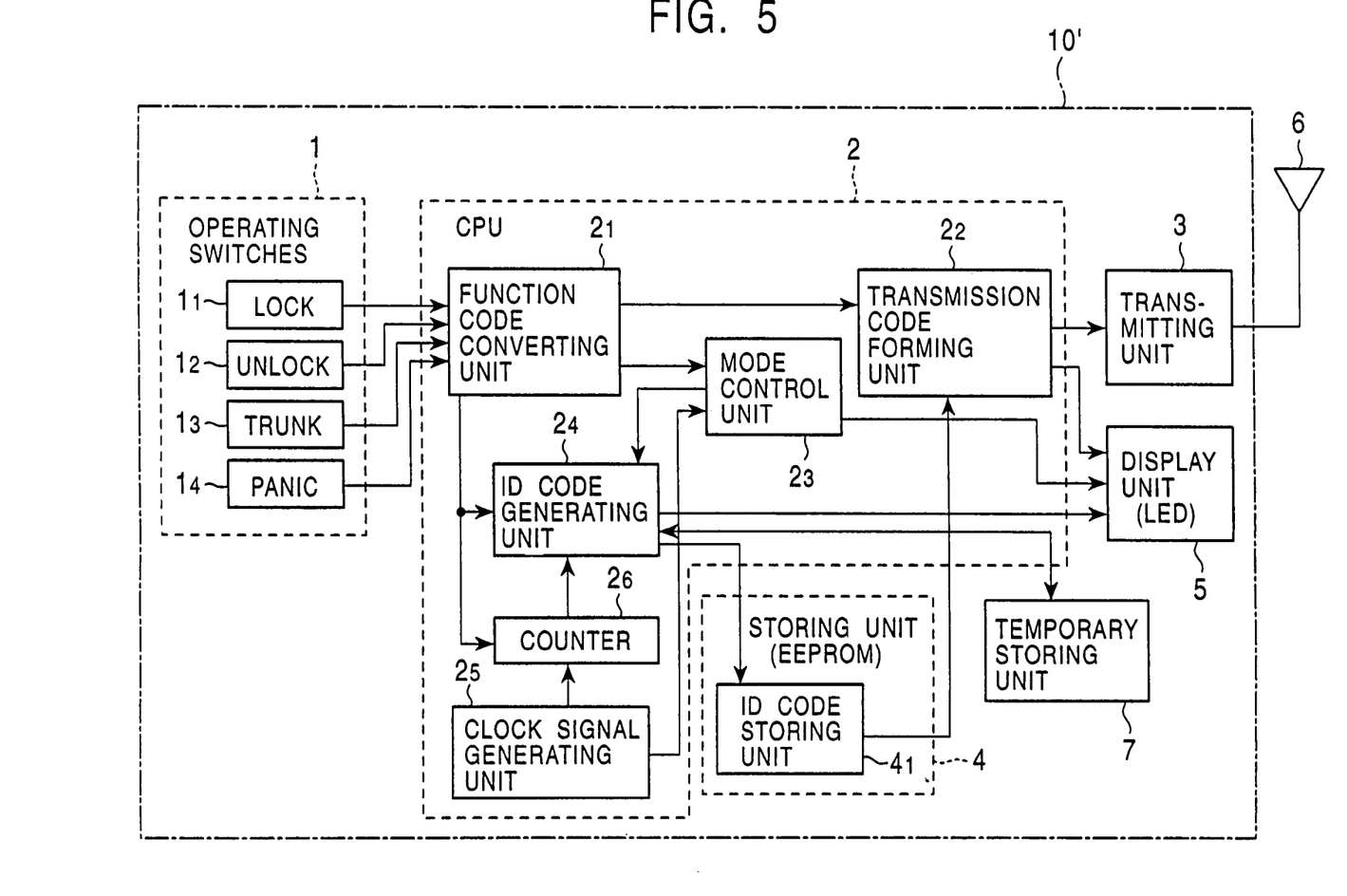
FIG. 5 is a block configuration diagram illustrating a second embodiment of the communication apparatus according to the present invention, and is a block diagram illustrating the configuration of the portable transmitter.

Next, FIG. 5' is a block diagram illustrating a second embodiment of the communication apparatus according to the present invention, and is a block diagram illustrating the configuration of a portable transmitter 10'.

As shown in FIG. 5, the only difference between the configuration of the portable transmitter 10' according to the second embodiment (hereafter referred to as "portable transmitter 10'") and the configuration of the portable transmitter 10 according to the first embodiment (hereafter referred to as "portable transmitter 10") is that the portable transmitter 10' is provided with RAM (temporary storing unit, i.e., second storing unit) 7, and the RAM 7 is joined with the ID code generating unit $2_4$, whereas the portable transmitter 10 does not have such a RAM 7, and other wise there is no configuration difference between the portable transmitter 10' and the portable transmitter 10. Accordingly, further description of the configuration of the portable transmitter 10' will be omitted.

Also, the configuration of the receiver 20 in the second embodiment is the same as the configuration of the receiver 20 according to the first embodiment shown in FIG. 2, so the receiver 20 according to the second embodiment is omitted from the drawings.

With the portable transmitter 10' having the above configuration, description of the operating procedures for registering the ID code to the ID code storing unit 41 (first storing unit) with reference to FIG. 3 is as follows.

The series of actions up to the control unit 2 of the portable transmitter 10 being set to the ID registration mode by the user executing predetermined operations of the operating switch unit 1 is the same as the series of actions already described with reference to FIG. 3.

Next, the series of actions of the user operating the latter-operated switch of the operating switch unit 1 of the portable transmitter 10 and the subsequent ending of operation of the switch leading up to the determining of the first count value of the clock signal at the counter $2_6$, is also the same as the series of actions already described with reference to FIG. 3.

Then, at the point that the first count value is determined, the determined count value is supplied to the RAM 7 through the ID code generating unit $2_4$, and is stored in the first storing area of the RAM 7 as the first ID code section. Subsequently, the counter $2_6$ is reset, then starts the second count of clock signals being supplied, and the first pulse signals are supplied multiple times from the ID code generating unit $2_4$ to the red LED as in the case above, so that the red LED is lit intermittently.

Next, the series of actions of the user operating the latter-operated switch of the operating switch unit 1 of the portable transmitter 10 for the second time, and the subsequent ending of operation of the switch leading up to the determination of the second count value of the clock signal at the counter $2_6$, is also the same as the series of actions already described with reference to FIG. 3.

Then, at the point that the second count value is determined, the count value is supplied to the RAM 7 through the ID code generating unit $2_4$, and is stored in the second storing area of the RAM 7 as the second ID code section. Subsequently, the counter $2_6$ is reset, then starts the third count of clock signals being supplied, and the first pulse signals are supplied multiple times from the ID code generating unit $2_4$ to the red LED as in the case above, so that the red LED is lit intermittently.

Next, the series of actions of the user operating the latter-operated switch of the operating switch unit 1 of the portable transmitter 10 for the third time, and the subsequent ending of operation of the switch leading up to the determination of the third count value of the clock signal at the counter $2_6$, is also the same as the series of actions already described with reference to FIG. 3.

Then, at the point that the third count value of the clock signal is determined, the count value is supplied to the RAM 7 through the ID code generating unit $2_4$, and is stored in the third storing area of the RAM 7 as the third ID code section.

Then, once the first through third ID code sections are each stored in the first through third storing areas of the RAM 7, the ID code generating unit 24 reads out and joins the first through third ID code sections from the RAM 7, the joined first through third ID code sections are transferred and supplied to the ID code storing unit 41 of the EEPROM 4 as an ID code, and thus registered.

In this case, the first through third ID code sections sequentially stored in the first through third storing areas of the RAM 7 (three count values) are each made up of 8 bits as with the above first embodiment, and one of the 256 combinations for data values from 00000000 through 11111111 is stored in the first through third storing areas.

Incidentally, with the above embodiment, first through third storing areas are provided in the RAM 7 of the portable transmitter 10', and the first through third ID code sections are respectively stored in the first through third storing areas in sequence, following which the first through third ID code sections are read out and joined, and registered to the ID code storing unit 41 as an ID code.

Third Embodiment

Figure 7:
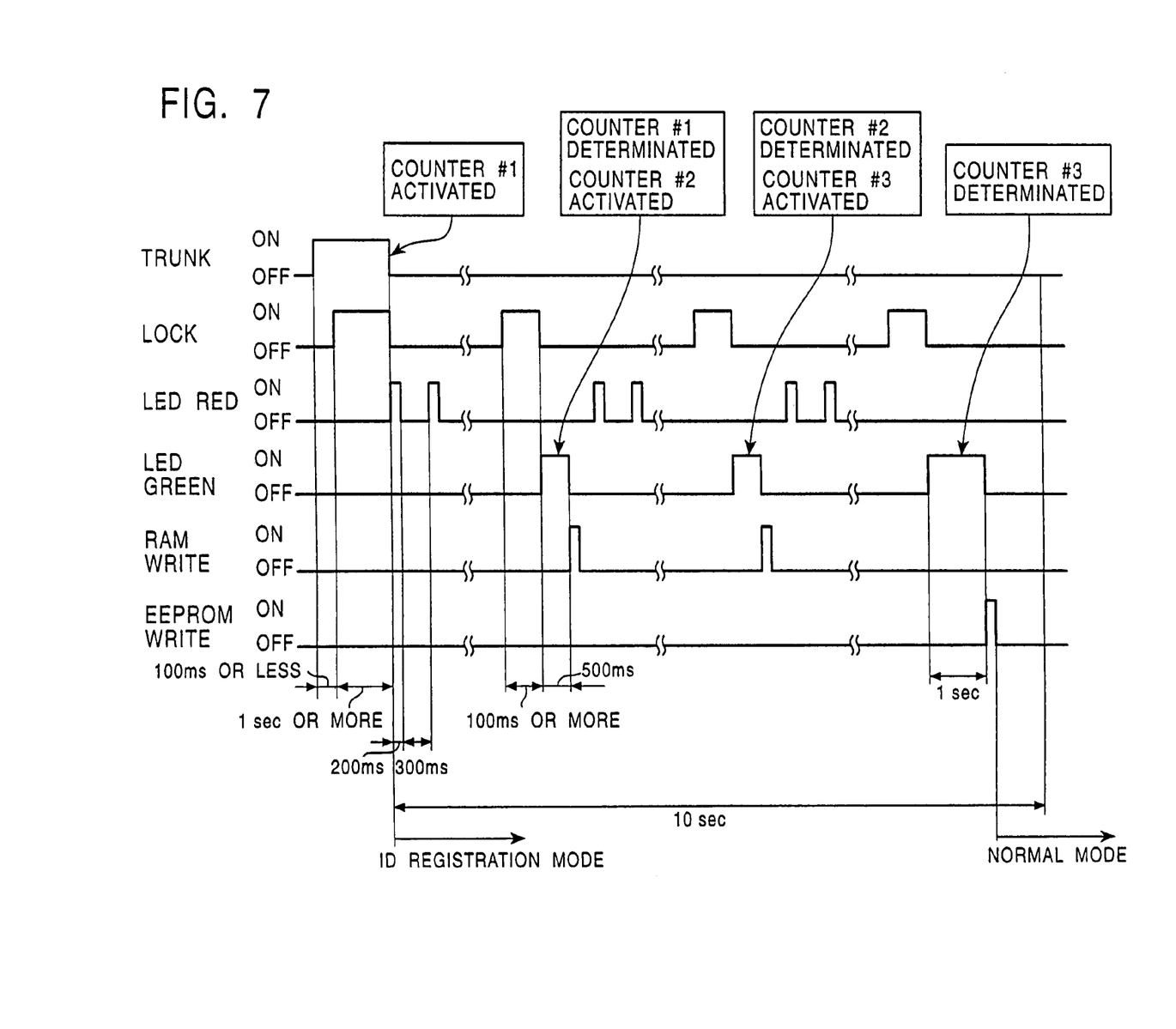
FIG. 7 is an explanatory diagram illustrating an example of the operating procedures for registering an ID code to the IUD code registering unit of the portable transmitter in a third embodiment of the communication apparatus according to the present invention.

Conversely, a third embodiment which has the same configuration as that of the second embodiment shown in FIG. 5 registers ID codes by the operation shown in FIG. 7. That is to say, only first and second storing areas are provided in the RAM 7, and the first and second ID code sections are respectively stored in the first and second storing areas in sequence. Then, at the point that the third count value is determined by the ID code generating unit $2_4$, and the third ID code section is thus obtained, this third ID code section is not stored in the RAM 7 but rather held in the ID code generating unit $2_4$. When the first ID code section and second ID code section are read out from the RAM 7, the third ID code section is joined to the first ID code section and second ID code section that are read out from RAM 7 so as to form an ID code, and this ID code is stored and registered to the ID code storing unit $4_1$.

In this case, in the event that the number of ID code sections making up the ID code is 4 or more, the ID code sections excluding the last ID code section are sequentially stored in the RAM 7, and at the point that the last ID code is obtained, this last ID code is not stored in the RAM 7 but rather held in the ID code generating unit $2_4$. When the ID code sections excluding the last ID code section are read out from the RAM 7, the last ID code section is joined to the ID code sections that are read out from the RAM 7 so as to form an ID code, and this ID code is stored and registered to the ID code storing unit $4_1$.

Also, with this portable transmitter 10' as well, in the event that 10 seconds elapse since the control unit 2 has been set to the ID registration mode, or in the event that registering of the ID code to the ID code storing unit $4_1$ is completed, the control unit 2 automatically reverts from the ID registration mode to the normal mode.

In this way, in the second and third embodiments as well, the first through third code sections (count values) stored in the RAM 7 are set randomly by the operating timing of switch operations made by the user, and the setting values cannot be selected at will. Accordingly, the probability that the ID code obtained by joining the first through third code section which is registered to one portable transmitter 10' and an ID code registered to another portable transmitter 10' using the same registering means match is extremely small, and thus a portable transmitter 10' with no compatibility can be obtained.

On the other hand, an example of the action in the event that the ID code cannot be registered to the ID code storing unit $4_1$ with the portable transmitter 10' will now be described.

That is, with the fist embodiment shown in FIG. 4, the storing unit where the count value is stored is RAM 7 instead of the EEPROM 4, and except for the fact that the ID code sections stored in the RAM 7 are discarded in the event that ID code registration is aborted, the procedures are the same.

Now, though the arrangement of the operating procedures for setting the first control unit 2 of the portable transmitter 10 and 10' to the ID registration mode according to the first through third embodiments involve a switch of the operating switch unit 1 being operated while another switch is being operated, the operating procedures for setting the first control unit 2 of the portable transmitter 10 and 10' to the ID registration mode according to the present invention are not restricted to such procedures. Rather an arrangement may be made wherein two or more switches are operated in a predetermined order, e.g., the door lock switch $1_1$ being operated first and then the trunk opening/closing switch $1_3$ being operated, following which and then the door unlock switch $1_2$ is operated, or, an arrangement may be made wherein operating of a specified one switch is repeatedly executed for a predetermined amount of time or longer, e.g., the door unlock switch $1_2$ being operated for one second and then the door unlock switch $1_2$ is operated for one second with a one second interval therebetween.

Also, according to the first through third embodiments, the door lock switch 1 used for setting the ID registration mode is also used for determining the count value, but there is no particular need to use the same switch for these switches. It can be arbitrary to decide which switch is to be used for determining the three count values and there is no distinguishable difference according to selection of the switch to be operated. In this case, arranging such that the count value is determined by randomly selecting and operating the switches at the time of determining the three count values does away with the need for requesting the user to take great care.

On the other hand, as with the first through third embodiments, stipulating that only one switch is used can prevent an ID code being registered by unintentional operation of switches, and stipulating that particular switches be used for each of the three count determinating operations allows ID code registration to be performed in an even more sure manner.

Further, an example has been described with regard to the first through third embodiments wherein the count of the counter $2_6$ is stopped by operating a switch, and resetting the counter $2_6$ each time determinating of a count value is performed, but an arrangement may be made wherein the counter $2_6$ is not reset but continues to count.

In this case, the cycle time for the count of the counter $2_6$ can be set arbitrarily, but setting the cycle time at approximately 500 milliseconds allows early operations by the user to be dealt with sufficiently, and also allows ID code with excellent randomness to be registered.

Figure 6:
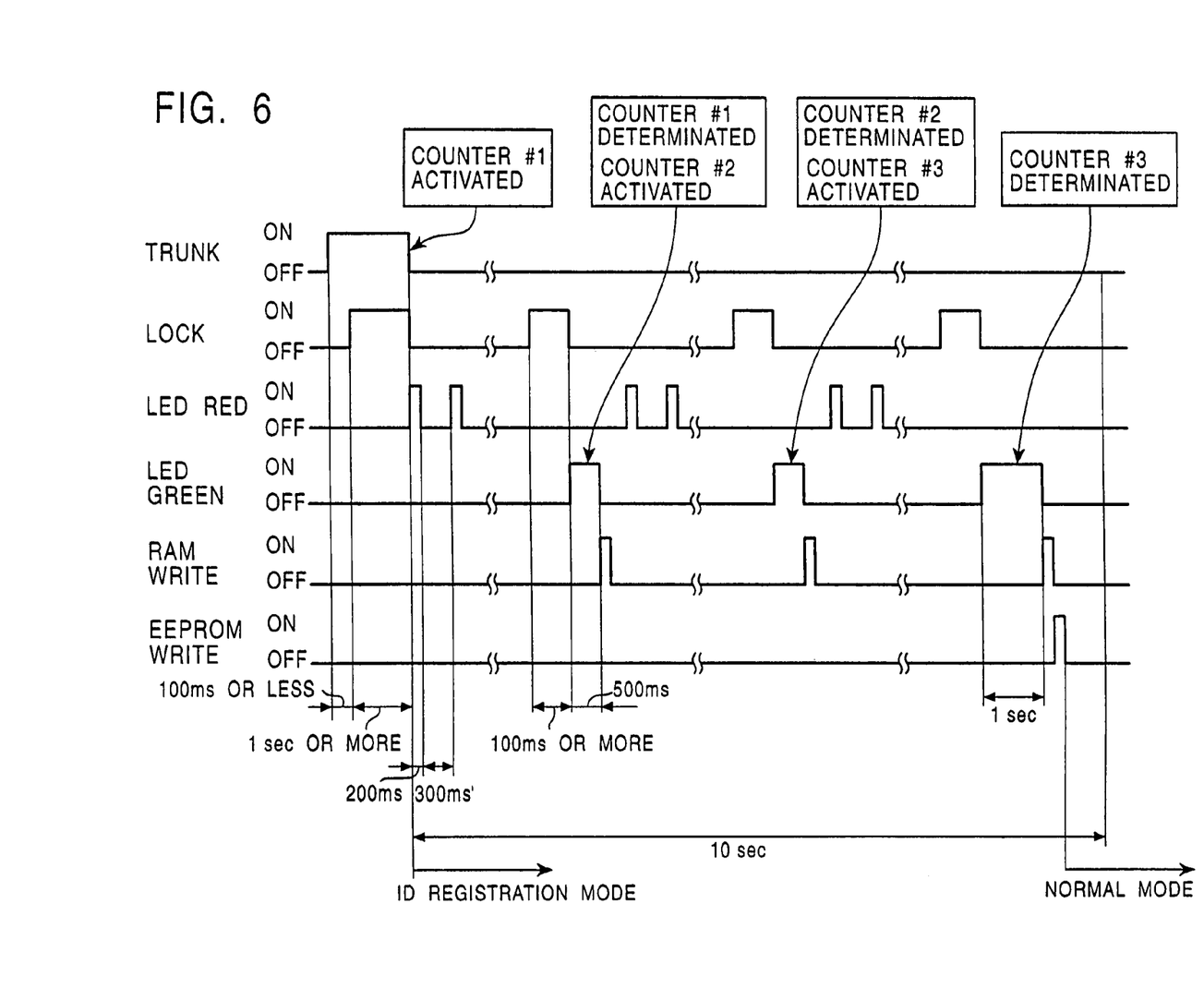
FIG. 6 is an explanatory diagram illustrating an example of the operating procedures for registering the ID code to the ID code storing unit with the portable transmitter shown in FIG. 5.

The operating (lit) time and operating (lit) intervals shown in FIGS. 3, 6, and 7, with regard to the first through third embodiments are nothing more than an example thereof, and the operating (lit) time and operating (lit) intervals may be changed arbitrarily.

Figure 8:
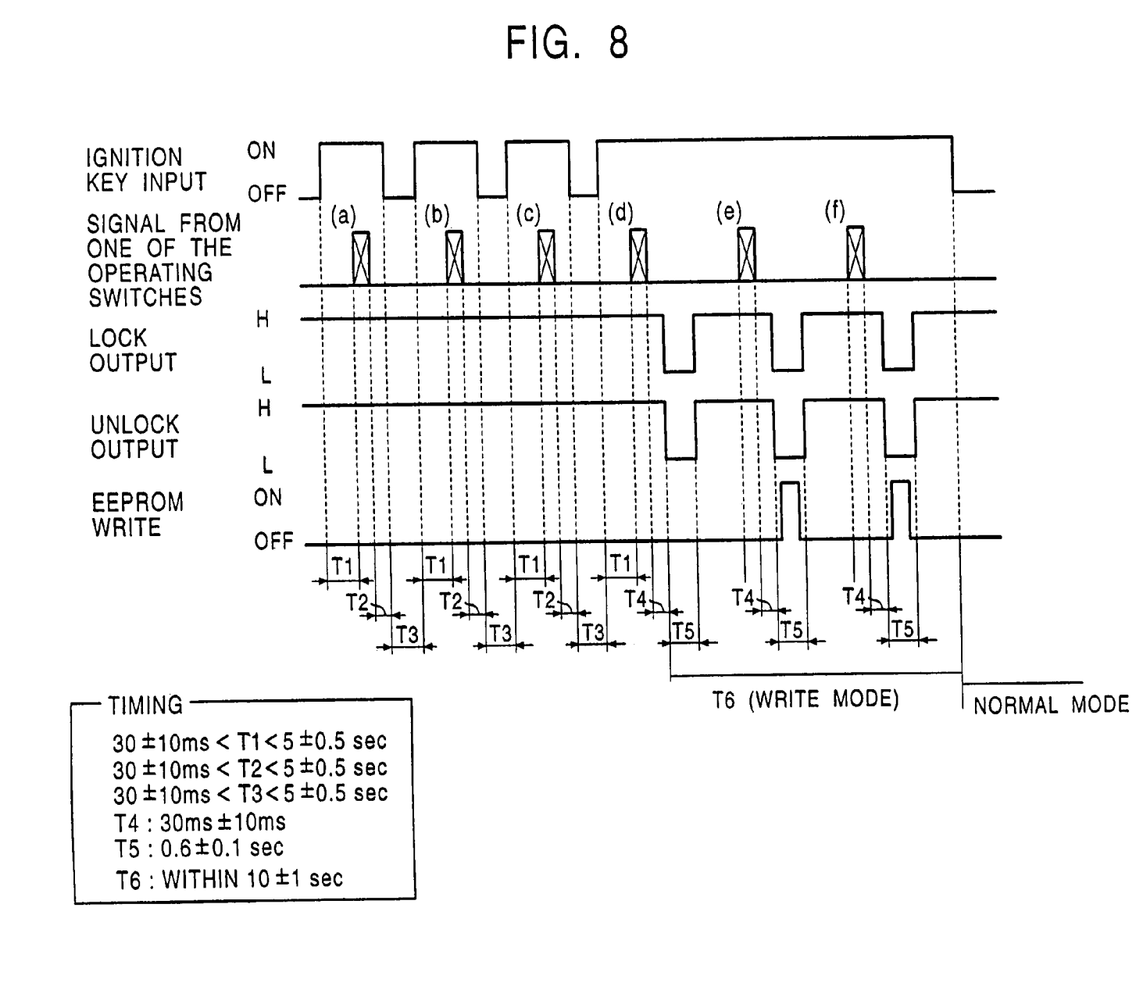
FIG. 8 is an explanatory diagram illustrating an example of the operating procedures for writing a reference code to the reference code storing unit of the receiver, using the portable transmitter.

Next, FIG. 8 is an explanatory diagram illustrating an example of the operating procedures for writing the reference code to the reference code storing unit $13_1$ of the receiver 20 using the portable transmitter 10 or portable transmitter 10'.

The operating procedures for writing the reference code to the reference code storing unit $10_1$ of the receiver 20 will be described with reference to FIG. 8. In the case of this operation, there is no difference between the portable transmitter 10 and the portable transmitter 10', so the operations using the portable transmitter 10 will be described representatively.

The user carries the portable transmitter 10, switches the ignition key 15 of the vehicle from the accessory (ACC) position to the on (ON) position, and supplies a key input pulse to the signal processing unit $12_1$. Next, the user presses one of the switches of the operating switch unit 1 of the portable transmitter 10 within a time T1 from the key input pulse being supplied to the signal processing unit $12_1$, and following the ID code "a" obtained by that operation being converted to a transmitting code, this is transmitted from the portable transmitter 10 as a transmitting signal. The receiver 20 receives this transmitting signal with the receiving unit 11 and supplies it to the signal processing unit $12_1$, following which the ID code "a" within the transmitting code is extracted. Next, the user switches the ignition key 15 from the ON position to the ACC position within a time T2 from the ending of the switch operation, thereby stopping the key input pulse from being supplied to the signal processing unit $12_1$. At this point, the flow returns to the initial state, thus completing the first action cycle.

Next, within a time T3 from the stopping the supplying of the key input pulse in the first action cycle, the user operates the ignition key 15 and the switch of the portable transmitter 10 in the same manner as with the first action cycle, and the second action cycle is completed through the same action series as that of the first action cycle.

Next, the same operation is performed in the third action cycle and the fourth action cycle. In this case, in the fourth action cycle, the action form is the same as that of the first through third action cycles up to the extracting of the ID code "d" within the transmitting code with the signal processing unit $12_1$ within the time T1 from the starting of supplying the key pulses, but the operating mode of the control unit 12 including the signal processing unit $12_1$ is converted from the normal action mode to the reference code writing mode at the point that the time T4 has elapsed from stopping the supplying of the ID code "d", and subsequently writing of the reference code can be performed.

The operating procedures for writing the reference code are as follows.

Following the operating mode of the control unit 12 being converted to the reference code writing mode, the user operates the portable transmitter 10 for writing the reference code, transmits a transmitting code containing the ID code "e" as transmitting signals, and sends this to the receiver 20. At the point that the transmitting code is supplied to the signal processing unit $12_1$ of the receiver 20 while the key input pulse is being supplied, the ID code "e" within the transmitting code is supplied to the reference code storing unit $13_1$ as the reference code within the time T4 from the stopping of supplying the transmitting code, and the first reference code is written to the reference code storing unit $13_1$. At this time, the fact that the writing of the reference code has been performed correctly is notified to the user by creating a door locked state or door unlocked state for a time T5.

Next, in the event that the user desires to write a reference (ID) code (second reference code) for another portable transmitter 10, the user operates this portable transmitter 10 in the same manner as the previous case, and writes the second reference code to the reference code storing unit $13_1$.

Subsequently, in the same way, in the event that there are other portable transmitters 10 to write reference code for, the user performs the same operating processes for writing reference code as above, which writes the reference codes to the reference code storing unit $13_1$.

In this case, the control unit 12 automatically reverts from the reference code writing mode to the normal action mode following elapsing of a set time T6 from being set to the reference code writing mode.

In this case, suitable time ranges for the times T1, T2, T3, T4, T5, and T6 are shown in FIG. 8, but the times T1 through T6 are not necessarily restricted to the time ranges shown.

Incidentally, the above description is regarding a case wherein reference codes are written to the reference code storing unit $13_1$ of the receiver 20 using portable transmitters 10, but reference codes can be written in the same manner using portable transmitters 10', as well.

Next, description will be made regarding the operation (normal operation) carried out between the portable transmitter 10 and the receiver 20 in the event that an ID code is registered in the ID code storing unit $4_1$ of the portable transmitter 10 (or portable transmitter 10') and a reference code corresponding to the ID code is registered in the reference code storing unit $13_1$ of the receiver 20.

In the event that the user operates one of the operating switches on the operating switch unit 1, e.g., the door lock switch $1_1$ for locking the doors of the vehicle, lock switch information indicating that the operation has been made from the lock switch $1_1$ is output, and supplied to the function code converting unit $2_1$. Upon receiving the lock switch information, the function code converting unit $2_1$ converts the lock switch information into a corresponding function code and supplies this to the transmitting code forming unit $2_2$. Once the function code is supplied, the transmitting code forming unit $2_2$ adds to the function code ID code unique to the portable transmitter 10 read from the ID code storing unit $4_1$, header code, end code, etc., thereby forming a transmitting code, and the formed transmitting code is supplied to the transmitting unit 3. The transmitting unit 3 forms transmitting signals of the supplied transmitting code being carried by wireless signals such as radio waves, and the transmitting signals are transmitted from the transmitting antenna 6.

On the other hand, once the receiver 20 receives the transmitting signals from the portable transmitter 10 with the receiving antenna 14, the transmitting signals are supplied to the receiving unit 11 as received signals, the receiving unit 11 restores the transmitting code within the received signals, and the obtained transmitting code is supplied to the signal processing unit 121. The signal processing unit 12, extracts the ID code within the supplied transmitting code, and compares the extracted ID code with the reference code registered in the reference code storing unit 131. In the event that the ID code and the reference code match, the function code in the transmitting code is collated with the various function codes stored in the function code storing unit 132. The control signal generating unit 122 generates control signals according to the function code which has been matched by collation, which in this case is a control signal for locking the vehicle doors, whereby the doors are locked by this control signal.

Also, in the event that other operating switches on the operating switch unit 1 are operated, e.g., the unlock switch 12 for unlocking the doors of the vehicle, function operations corresponding to the operating switch are carried out at the vehicle.

Incidentally, though the above description of the above embodiments has been made with reference to an example of a keyless entry device for the communication apparatus, the communication apparatus according to the present invention is by no means restricted to a keyless entry device; rather, the present invention can be applied to other apparatuses which have a portable transmitter and a receiver, and which resemble a keyless entry device.

Thus, according to the first aspect of the present invention, ID code registration can be made from the portable transmitter by operation of the user, and in this case, the ID code to be registered is a random code due to the switch operation timing, so a portable transmitter wherein there is no compatibility between the portable transmitter of the user and the portable transmitters of others can be obtained.

Also, according to the second aspect of the present invention, the formed ID code sections are sequentially stored in a second storing unit formed of RAM, and at the point that all ID code sections are stored in the second storing unit, all ID code sections are joined and read out from the second storing unit, and transferred and registered as ID code to the first storing unit, so in the event that ID code registration has been aborted, all that is necessary is to erase the ID code sections stored in the RAM, so there is no effect on the first storing unit.

Also, according to the third aspect of the present invention, the formed ID code sections are sequentially stored in a second storing unit formed of RAM, and at the point that the last ID code section is formed, the ID code sections stored in the second storing unit are read out from the second storing unit and joined with the last ID code section, and transferred and registered as ID code to the first storing unit, so the process of storing and reading the last ID code section to and from the second storing unit can be omitted, which is efficient.

Thus, the present invention is a communication apparatus that comprises a portable transmitter and a receiver. The portable transmitter includes at least one operating switch, a storing unit, a control unit, an ID registering mode setting mechanism and a transmitting unit. The storing unit contains an ID code that has ID code sections, each of which corresponds to an operation of the operating switch. The ID registering mode setting mechanism sets the control unit to an ID registration mode, and subsequently when the operating switch is operated the ID code sections are supplied to the storing unit to register as the ID code.

However, more than one operating switch may exist and/or the operating switch(es) may be operated multiple times in a predetermined order or format before the ID code sections register as the ID code. Similarly, if the operating switch(es) are not operated in the predetermined order or format within a set amount of time, the control unit may revert out of the ID registration mode.

The portable transmitter may have an additional storage unit that stores either all of the ID code sections comprising the ID code or all of the ID code sections except the last ID code section. In these cases, either when the additional storage unit stores all ID code sections, as in the former case, or when the additional storage unit stores all ID code sections except the last ID code section, as in the latter case, the ID code sections are joined and transferred to the first storing unit to register as said ID code.

In addition, the ID code sections may be sequentially supplied to the storing unit (s). The portable transmitter may also comprise a clock generating unit that generates clock signals and a counter that counts the clock signals and forms the ID code sections from the counter values. An LED or other mechanism may be used to notify the user of the storage state of the ID code sections.

What is claimed is:

1. A communication apparatus, comprising:
   a portable transmitter including:
      at least one operating switch,
      a first storing unit containing an ID code registered therein, the ID code including a plurality of ID code sections forming one ID code as a whole, each ID code section being generated corresponding to an operation of said at least one operating switch,
      a first control unit,
      an ID registering mode setting mechanism to set the first control unit to an ID registration mode, and
      a transmitting unit to transmit an electromagnetic signal having the ID code; and
   a receiver including:
      a receiving unit to receive the electromagnetic signal having the ID code,
      a second storing unit containing a reference code stored therein, and
      a control signal generating unit;
   said receiver comparing said ID code within the electromagnetic signal with said reference code and supplying control signals from said control signal generating unit to a controlled device when said ID code and said reference code match; and,
   wherein when said first control unit is set to the ID registration mode by said ID registration mode setting mechanism and said at least one operating switch is operated, the ID code sections are supplied to said first storing unit to be registered as said ID code.

2. A communication apparatus according to claim 1, wherein when said first control unit is set to the ID registration mode by said ID registration mode setting mechanism, said at least one operating switch is operated multiple times before the ID code sections are registered as said ID code.

3. A communication apparatus according to claim 2, wherein the ID code sections are sequentially supplied to said first storing unit.

4. A communication apparatus according to claim 1, wherein said ID registration mode setting mechanism comprises said at least one operating switch and a mode control unit within said first control unit to set the ID registration mode from the operation of said at least one operating switch in a predetermined format.

5. A communication apparatus according to claim 4, further comprising at least two operating switches, said ID registration mode setting mechanism further comprising operation of said at least two operating switches in a predetermined order.

6. A communication apparatus according to claim 1, said portable transmitter further comprising:
   a clock generating unit to generate clock signals; and
   a counter to count the clock signals generated by said clock generating unit; and,
   wherein said ID code sections are formed by counter values of said counter.

7. A communication apparatus according to claim 6, wherein said counter value is determined by an operation timing of said operating switch.

8. A communication apparatus according to claim 1, said portable transmitter comprising a notifying mechanism to indicate a storage state of said ID code sections.

9. A communication apparatus according to claim 8, wherein said notifying mechanism is a light-emitting diode.

10. A communication apparatus according to claim 1, wherein when said first control unit is set to the ID registration mode and said at least one operating switch is not operated within a predetermined time period, said first control unit reverts out of the ID registration mode.

11. A communication apparatus according to claim 2, wherein when said first control unit is set to the ID registration mode by said ID registration mode setting mechanism and said at least one operating switch is not operated multiple times within a predetermined time period, said first control unit reverts out of the ID registration mode.

12. A communication apparatus, comprising:
a portable transmitter including:
at least one operating switch,
a first storing unit containing an ID code registered therein, the ID code including a plurality of ID code sections, each ID code section being generated corresponding to an operation of said at least one operating switch,
a second storing unit,
a first control unit,
an ID registering mode setting mechanism to set the first control unit to an ID registration mode, and
a transmitting unit to transmit an electromagnetic signal having the ID code; and
a receiver including:
a receiving unit to receive the electromagnetic signal having the ID code,
a third storing unit containing a reference code stored therein, and
a control signal generating unit;
said receiver comparing said ID code within the received said electromagnetic signal with said reference code and supplying control signals from said control signal generating unit to a controlled device when said ID code and said reference code match; and,
wherein when said first control unit is set to the ID registration mode by said ID registration mode setting mechanism and said at least one operating switch is operated, said ID code sections are stored in said second storing unit, and when all ID code sections comprising the ID code are stored in said second storing unit, said all ID code sections are joined and transferred to said first storing unit to be registered as said ID code.

13. A communication apparatus according to claim 12, wherein when said first control unit is set to the ID registration mode by said ID registration mode setting mechanism, said at least one operating switch is operated multiple times before the ID code sections are registered as said ID code.

14. A communication apparatus according to claim 13, wherein the ID code sections are sequentially stored in said second storing unit.

15. A communication apparatus according to claim 12, wherein said ID registration mode setting mechanism comprises said at least one operating switch and a mode control unit within said first control unit to set the ID registration mode from the operation of said at least one operating switch in a predetermined format.

16. A communication apparatus according to claim 15, further comprising at least two operating switches, said ID registration mode setting mechanism further comprising operation of said at least two operating switches in a predetermined order.

17. A communication apparatus according to claim 12, said portable transmitter further comprising:
a clock generating unit to generate clock signals; and
a counter to count the clock signals generated by said clock generating unit; and,
wherein said ID code sections are formed by counter values of said counter.

18. A communication apparatus according to claim 17, wherein said counter value is determined by an operation timing of said operating switch.

19. A communication apparatus according to claim 12, said portable transmitter comprising a notifying mechanism to indicate a storage state of said ID code sections.

20. A communication apparatus according to claim 19, wherein said notifying mechanism is a light-emitting diode.

21. A communication apparatus according to claim 12, wherein when said first control unit is set to the ID registration mode and said at least one operating switch is not operated within a predetermined time period, said first control unit reverts out of the ID registration mode.

22. A communication apparatus according to claim 12, wherein when said first control unit is set to the ID registration mode by said ID registration mode setting mechanism and said at least one operating switch is not operated multiple times within a predetermined time period, said first control unit reverts out of the ID registration mode.

23. A communication apparatus, comprising:
a portable transmitter including:
at least one operating switch,
a first storing unit containing an ID code registered therein, the ID code including a plurality of ID code sections, each ID code section being generated corresponding to an operation of said at least one operating switch,
a second storing unit,
a first control unit,
an ID registering mode setting mechanism to set the first control unit to an ID registration mode, and
a transmitting unit to transmit an electromagnetic signal having the ID code; and
a receiver including:
a receiving unit to receive the electromagnetic signal having the ID code,
a third storing unit containing a reference code stored therein, and
a control signal generating unit;
said receiver comparing said ID code within the received said electromagnetic signal with said reference code and supplying control signals from said control signal generating unit to a controlled device when said ID code and said reference code match; and,
wherein when said first control unit is set to the ID registration mode by said ID registration mode setting mechanism and said at least one operating switch is operated, said ID code sections are stored in said second storing unit except for a final ID code section, and when the final ID code section is formed, the ID code sections stored in said second storing unit are read out, and the ID code sections read out from said second storing unit and said last ID code section are joined and transferred to said first storing unit to be registered as said ID code.

24. A communication apparatus according to claim 23, wherein when said first control unit is set to the ID registration mode by said ID registration mode setting mechanism, said at least one operating switch is operated multiple times before the ID code sections are registered as said ID code.

25. A communication apparatus according to claim 24, wherein the ID code sections except for the final ID code section are sequentially stored in said second storing unit.

26. A communication apparatus according to claim 25, wherein said ID registration mode setting mechanism comprises said at least one operating switch and a mode control unit within said first control unit to set the ID registration mode from the operation of said at least one operating switch in a predetermined format.

27. A communication apparatus according to claim 26, further comprising at least two operating switches, said ID registration mode setting mechanism further comprising operation of said at least two operating switches in a predetermined order.

28. A communication apparatus according to claim 23, said portable transmitter further comprising:

a clock generating unit to generate clock signals; and
a counter to count the clock signals generated by said clock generating unit; and,
wherein said ID code sections are formed by counter values of said counter.

29. A communication apparatus according to claim 23, said portable transmitter comprising a notifying mechanism to indicate a storage state of said ID code sections.

30. A communication apparatus according to claim 29, wherein said notifying mechanism is a light-emitting diode.

31. A communication apparatus according to claim 23, wherein when said first control unit is set to the ID registration mode and said at least one operating switch is not operated within a predetermined time period, said first control unit reverts out of the ID registration mode.

32. A communication apparatus according to claim 24, wherein when said first control unit is set to the ID registration mode by said ID registration mode setting mechanism and said at least one operating switch is not operated multiple times within a predetermined time period, said first control unit reverts out of the ID registration mode.

33. A communication apparatus according to claim 28, wherein said counter value is determined by an operation timing of said operating switch.

* * * * *